March 5, 1946.  J. M. TURNER  2,396,063
AUTOMOBILE JACK
Filed Jan. 25, 1943  2 Sheets-Sheet 1

John M. Turner
INVENTOR.

BY Milo B. Stevens & Co.

ATTORNEYS.

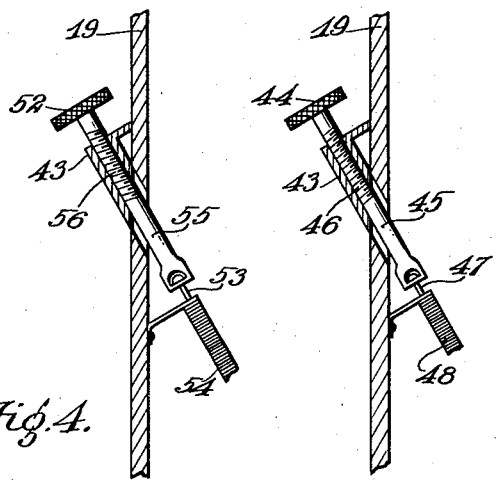
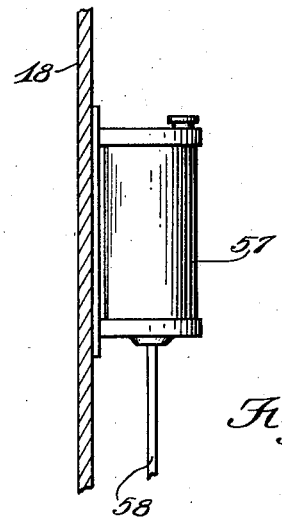
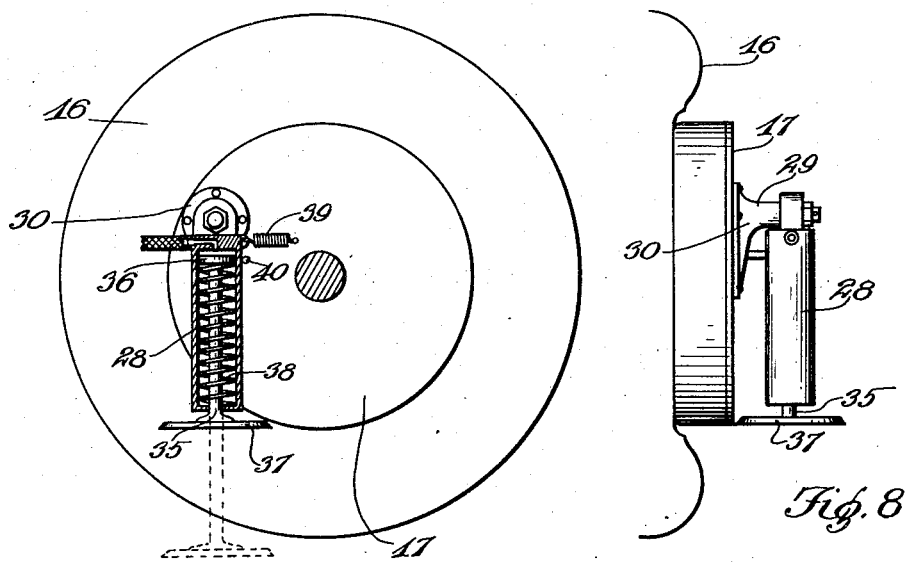

Patented Mar. 5, 1946

2,396,063

UNITED STATES PATENT OFFICE 2,396,063

AUTOMOBILE JACK

John M. Turner, Thedford, Nebr.

Application January 25, 1943, Serial No. 473,515

1 Claim. (Cl. 303—6)

My invention relates to automobile jacks, and more particularly to the type in which individual jacks are provided for the wheels, with suitable connections to a motive source and controls in the driver's compartment. Various developments particularly along hydraulic lines are represented in the prior art, but many of these are unduly complicated and therefore costly to install. Moreover, a hydraulic system for automobile jack operation is generally considered a separate apparatus or installation, which presents the problem of application to existing automobiles or the inclusion of a considerable amount of extra materials in new cars.

In the light of the above phases of the construction and application of a hydraulic jack system, it is my main object to apply such a system not by means of separate equipment or installation, but by largely including the jack system in the standard hydraulic brake system of the car.

A further object of the invention is to provide means whereby the brakes of the car may be locked preliminary to the raising of a designated jack, in order that no influence to upset the jack may arise.

A still further object of the invention is to provide means whereby a pumping action of the regular brake pedal may procure the raising of a designated jack.

Another object of the invention is to largely retain the automobile braking system as a carrier or conduit for the jack-operation medium, only adding branch leads from the braking system to the individual jacks carried alongside the wheels.

An additional object of the invention is to design the jack system for operation in common with the braking system by utilizing the braking fluid as a motive medium for both the braking and jacking functions.

A further object of the invention is to provide a system of handy controls which may be easily set or actuated to connect the jacking apparatus into the braking system or disconnect the same therefrom.

An important object of the invention is to design the novel jacking apparatus with parts which constitute few and simple additions to the standard braking system.

With the above objects in view, and any others which may suggest themselves from the description to follow, a better understanding of the invention may be had by reference to the accompanying drawings, in which—

Fig. 4 is an enlarged section of an actuator for the valve of Figure 2;

Fig. 5 is a view similar to Figure 4 of an actuator for the valve of Figure 3;

Fig. 6 is an enlarged detail of a reserve tank for the hydraulic brake system;

Fig. 7 is an enlarged section of a jack unit on the line 7—7 of Figure 1; and

Fig. 8 is a left-hand side view of the showing in Figure 7.

Figure 3:
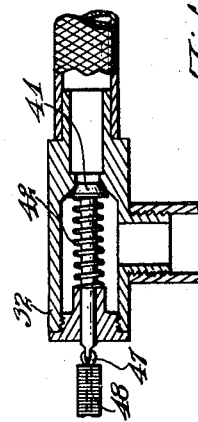
Fig. 3 is an enlarged plan section of a jack-controlling valve occurring in proximity to each jack.
Figure 1:
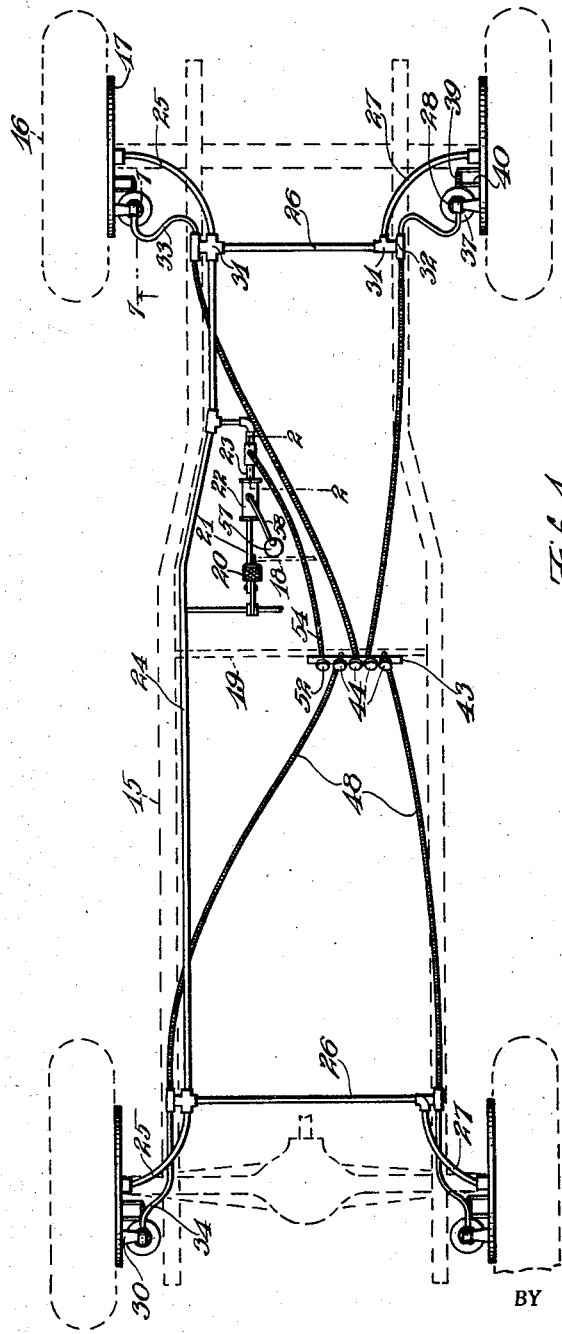
Figure 1 is a plan view of the comprehensive braking and jacking system.

In accordance with the foregoing, specific reference to the drawings indicates an outline of a typical automobile chassis at 15, the wheels thereof being shown at 16, the stationary brake plates at 17, the dash at 18, the instrument board at 19, and the brake pedal at 20. As is customary, a rod 21 from the brake pedal operates the brake cylinder 22 from which a main 23 extends to communicate with a longitudinal conduit 24 leading from front to rear, the ends of the conduit being supplemented by hose sections 25 leading to the mechanism carried by the related brake plates 17 at one side of the car. The conduit 24 extends toward the opposite side of the car with branches 26 which are supplemented by hose connections 27 to the brake plates at the other side of the car.

Since the improved jack system utilizes the braking fluid as a motive source, the brake conduits are tapped to branch off to the individual jack units of the wheels. One such unit is essentially in the form of a vertical cylinder 28 which is hung pivotally from a side pin 29 carried by each brake plate 17, the pin being reinforced by a bracket formation 30. As the cylinder 28 is designed to receive the fluid from the braking conduits, the latter are formed with fittings of T or cross types 31 before the hose connections 25 and 27 to provide outlets into valve chambers 32. These extend longitudinally of the car, and the forward ends of the pair in front are extended with hose sections 33 to connect with the front cylinders 28, while the rear ends of the valve chambers in back are connected with similar hose lengths 34 to the back cylinders 28.

It is noted that the jacks or cylinders are hung to the rear of the center regions of the plates 17. This is to place the jacks out of the way. The plates 17 represent portions of the axles or other bottom or unsprung parts of the car, but it is understood that where such bottom or unsprung parts are not in the form of brake plates, they may be formed with the pins 29 in positions or ways best suited for the suspension of the jacks.

Each jack represented by a cylinder 28 simply contains a vertical rod 35 formed with a top plunger 36 and extending through the bottom of the cylinder 28 to terminate with a bottom or ground plate 37. It is understood that fluid under pressure which enters into the top of the cylinder 28 will have the effect of extending the plunger downwardly and raising the particular wheel; and a compression spring 38 in the cylinder serves to raise the plunger when the pressure of the fluid has been relieved, whereby to restore the jack to the original position and lower the wheel. Since it has been mentioned that the brakes of the car are locked preliminary to the jacking function, the jacks 28 need not be secured laterally. Thus, by simply depending from its pivot, each jack is vertical when it meets the ground, and the locked condition of the wheels permits it to undergo the raising operation without strain or the hazard of collapse. Further, the pivoting of the jacks enables them to yield in rearward directions in case they should meet road obstacles while the car is in motion. However, in order that the jacks may not oscillate or become noisy while the car is in motion, a suitable device such as a draw spring 39 and stop pin 40 may be provided in front to normally hold each jack stationary.

The valve chambers 32 essentially serve as transfer means for the fluid from the braking system into the individual jack-hose sections 33 and 34. Since the braking system is almost constantly in use, while the need for a jacking operation is very infrequent, it follows that passage of the fluid into the hose sections 33 and 34 must be normally blocked. For this reason, each of the chambers 32 contains a valve 41 which is held normally closed by a spring 42 to block communication from the related fitting 31 into the particular hose section 33 or 34; and only a pulling or withdrawing action of the valve 41 will open the passage into the hose section. A poppet type of valve has been illustrated, but a ball-type or any other which will perform the described function may be chosen for the purpose.

The opening of a designated one of the four valves 41 is an indication that the braking fluid is intended to operate the related jack. For purposes of convenience, the selective control of the valves is centered in front of the instrument board 19, where a suitable panel 43 is mounted to present four actuating buttons 44 within easy reach of the driver. As indicated in Figure 5, these buttons have shanks 45 with right-hand threads 46 designed to cause the withdrawing motion of the shanks when the buttons are turned in a counter-clockwise direction. The shanks 45 make swivel connections with piano wire or cable leads 47 which extend to the various valves 41 and are preferably encased in flexible conduits 48. Thus, with the buttons 44 properly marked, the opening of a chosen valve may be easily accomplished as mentioned; and it is understood that the valve will close by the force of its spring when the button is rotated in the opposite direction.

Figure 2:
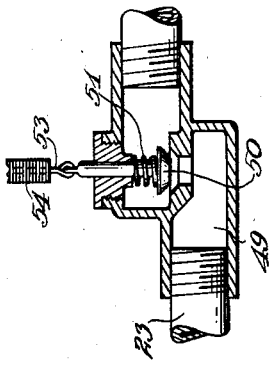
Fig. 2 is an enlarged section of a brake-controlling valve taken on the line 2—2 of Figure 1.

In the operation of the standard hydraulic brake, the fluid is sent out of the brake cylinder under pressure to branch off to the brake units of the wheels. Since the brake system must be ready for service at all times, it is essential that the line from the brake cylinder be kept open for the system to function as stated. I have inserted a valve housing 49 in the conduit 23 which contains a valve 50 backed by a spring 51. The valve is normally positioned withdrawn or open, as indicated in Figure 2, this condition being maintained by an actuating button 52 on the panel 43 through a piano wire or cable connection 53 encased in a conduit 54. The button 52 is designed along the lines of the buttons 44, except that its shank 55 has a left-hand thread 56. Thus, the counter-clockwise rotation of the button 52 will feed its shank in a forward direction and cause the spring 51 to close the valve 50.

During the normal operation of the car, it is assumed that all the actuating buttons are positioned at the extreme of their clockwise rotations, which may be evident on inspection or from suitable markings on the buttons or panel as the choice of the designer or manufacturer may dictate. To put a jack into operation, it is first necessary to actuate the button 52 with the effect of closing the valve 50. The closing of this valve does not permanently block the progress of the braking fluid from the cylinder 22 when the brake pedal is pressed, as the valve 50 will then operate as a check-valve due through the elongated links, or other lost motion connection 53a, 51a, between piano wire 53 and the stem of the valve 51. Now, a selected one of the buttons 44 is also rotated to secure an outlet for the brake fluid into a chosen jack. Now the brake pedal is pumped a number of times in order to build up the volume of brake fluid in the brake conduits and force the same into the hose connection 33— or 34—and the related jack cylinder. As this action will require additional brake fluid, a reservoir tank 57 of the same is mounted on the forward side of the dash 18 and connects with the top of the brake cylinder by means of a pipe 58. Thus, when the pumping of the brake pedal is no longer possible, the indication is that the brake fluid has been forced to lock all the brakes and fully extend the plunger 35 of the chosen jack, lifting the particular wheel. When the function of the jack is over, it is first necessary to turn the button 52 back—in a clockwise direction—which action will withdraw the valve 50 to the normal position indicated in Figure 2. This will relieve the pressure of the fluid in the conduits and jack, so that the fluid will back up into the brake cylinder 22 and the reservoir tank 57; and this action will be expedited by the expansion of the jack spring 38 which acts to raise the plunger 36, forcing the fluid out of the jack and, incidentally, lowering the wheel. Now the selected button 44 is actuated in the same way as the previous button 52 in order to close the valve 41 of the affected jack and block the brake fluid from reaching the jack during the normal operation of the car.

While the operation of the improved jack system has been described in respect to a single jacking operation to raise a chosen wheel of the car, it is also possible to utilize the system in other respects. Thus, by simply actuating the button 52 and giving the brake pedal one push, all the wheel brakes become locked, so that the car cannot be rolled or pushed away from a parking place; also, in case an attempt is made to steal the car by hoisting either end from a towing truck, the ground wheels will drag, indicating an unusual condition. Further, the system can be used to jack up all the wheels until they merely touch the ground, taking the weight of the car off the tires and helping preserve the same. If this expedient is employed and the brakes are all set, the car cannot be accidentally pushed to roll off the jacks. However, when the use of the car is again desired, it is only necessary to release the button 52, which will permit the fluid to return to the brake cylinder 22 and reservoir 57. To facilitate this, brake pedal 20 is operated to cause valve 50 to open to relieve back pressure at the time button 52 is operated. Then the valves 41 may be closed through the use of buttons 44. The car is then ready for use in the ordinary manner.

It will be evident from the above description that I have provided a jack system which is not a separate equipment, but an extension of the regular hydraulic braking system of the car. Thus, this system is only extended or developed in limited respects without undue complications or in any way prejudicing or impairing the action of the braking function. The parts entering into the installation are few and simple, and the development for the jacking purpose is not materially visible or noticeable on the car. Yet, the benefit of the highly desirable individual and automatic automobile jack is gained and is possible of being made standard equipment in new cars or installed as accessory equipment in existing ones. The actuating mechanism of the buttons has been presented as a simple assembly, but it is apparent that other means might be devised to exercise the control of the valves in the same manner. It is also possible that some means could be devised to keep the jacks swung up in a horizontal position while not in use and to have them lowered into the pendent positions when to be used, but devices on this order are shown in various designs in the prior art and may be utilized if found of particular advantage, although a significant attribute of the present system is the simplicity of the hand controls and the mere use of the brake pedal to induce the jacking operation. Finally, it is conceivable that the present development, due to its simplicity of construction and application, may be produced and made available to the motoring public at fairly low cost.

While I have described the invention along specific lines, various minor changes or refinements may be made therein without departing from its principle, and I desire to consider all such changes and refinements as coming within the scope and spirit of the appended claim.

I claim:

A hydraulic wheel jacking system for automobiles having a brake pedal controlled fluid supply cylinder, a conduit leading therefrom, hydraulic pressure leads from said conduit to the brakes; comprising a jack unit for each wheel and operable by fluid pressure, a branch from each of said leads to the correspondingly located jack unit, a check valve in said supply cylinder conduit, means tending to maintain said valve seated but yielding to admit of opening of the valve under pressure from the direction of said supply cylinder, manually operable retaining means for holding said valve open against the action of said yielding means, said check valve controlling the supply to said leads and operable by a pumping action of the automobile brake pedal to amplify the contents of the leads to the extent of supplying a selected jack unit, and manually controlled valve means for establishing communication between the respective leads and branches.

JOHN M. TURNER.